(12) United States Patent
Chen et al.

(10) Patent No.: US 11,384,878 B2
(45) Date of Patent: Jul. 12, 2022

(54) COUPLING DEVICE

(71) Applicants: Yuan-Lai Chen, Taichung (TW);
Da-Tan Liu, Taichung (TW)

(72) Inventors: Yuan-Lai Chen, Taichung (TW);
Da-Tan Liu, Taichung (TW)

(*) Notice: Subject to any disclaimer, the term of this patent is extended or adjusted under 35 U.S.C. 154(b) by 105 days.

(21) Appl. No.: 16/986,028

(22) Filed: Aug. 5, 2020

(65) Prior Publication Data
US 2022/0042630 A1 Feb. 10, 2022

(51) Int. Cl.
*F16L 23/10* (2006.01)
*F16L 23/06* (2006.01)
*F16L 33/12* (2006.01)

(52) U.S. Cl.
CPC .............. *F16L 23/10* (2013.01); *F16L 23/06* (2013.01); *F16L 33/12* (2013.01)

(58) Field of Classification Search
CPC ............ F16L 23/10; F16L 23/06; F16L 33/12
See application file for complete search history.

(56) References Cited

U.S. PATENT DOCUMENTS

| | | | | |
|---|---|---|---|---|
| 3,705,453 A * | 12/1972 | Olson | ................ | B23K 37/0533 29/256 |
| 4,341,406 A * | 7/1982 | Abbes | ................... | F16L 23/10 285/408 |
| 4,400,018 A * | 8/1983 | Abbes | ................... | F16L 23/10 285/31 |
| 5,522,625 A | 6/1996 | Flick | | |
| 8,899,088 B1 * | 12/2014 | Hazen | ................... | B25B 13/52 72/292 |

FOREIGN PATENT DOCUMENTS

| | | | | |
|---|---|---|---|---|
| DE | 19750251 A1 * | 6/1999 | ............. | F16L 23/06 |
| EP | 1081424 A1 * | 3/2001 | ............. | F16L 23/06 |

* cited by examiner

*Primary Examiner* — James M Hewitt, II
(74) *Attorney, Agent, or Firm* — Muncy, Geissler, Olds & Lowe, P.C.

(57) ABSTRACT

A coupling device for coupling flanges of two pipes includes a chain assembly and a positioning mechanism. The chain assembly includes plural connecting pieces pivotally connected one by one by pivot members. The connecting pieces at two opposite ends of the chain assembly are defined as a first connecting piece and a second connecting piece. A first pivot member is arranged at the free end of the first connecting piece, and a second pivot member is arranged at the free end of the second connecting piece. The positioning mechanism includes a first portion and a second portion pivotally connected. The first portion is pivotally connected to the first pivot member or the first connecting piece, and the second portion is detachably positioned to the second pivot member. The first portion is rotatable between a release position and a fixed position relative to the second portion.

7 Claims, 5 Drawing Sheets

COUPLING DEVICE

BACKGROUND OF THE INVENTION

Field of the Invention

The present invention relates to a coupling device.

Description of the Prior Art

Generally, it is usually to use irreversible fixing means such as welding, adhesion to connect two pipes. However, if two pipes have to be separated, other temporary connection fixing means (screwing or clamping) could be used.

A typical flange clamp as disclosed in U.S. Pat. No. 5,522,625, usually includes two semicircular bodies and a fixing mechanism connected between the two semicircular bodies. The two semicircular bodies are disposed on flanges of two pipes, and the then the two semicircular bodies are tightened by the fixing mechanism to fixedly couple the two pipes.

However, the shape and size of the clamp surface of this type of structure depends on the inner surface of the two semicircular bodies. That is, this type of clamp can only be applied to a flange of a specific size and cannot be applied to a flange of larger or smaller size.

The present invention is, therefore, arisen to obviate or at least mitigate the above-mentioned disadvantages.

SUMMARY OF THE INVENTION

The main object of the present invention is to provide a coupling device which can effectively tighten flanges of pipes with various sizes.

To achieve the above and other objects, a coupling device for coupling flanges of two pipes is provided, including: a chain assembly, including a plurality of connecting pieces and a plurality of pivot members, the plurality of connecting pieces being pivotally connected one by one by the plurality of pivot members to be chain-like, one of the plurality of connecting pieces at one of two opposite ends of the chain assembly being defined as a first connecting piece, a free end of the first connecting piece having a first pivot member, another one of the plurality of connecting pieces at the other of the two opposite ends of the chain assembly being defined as a second connecting piece, a free end of the second connecting piece having a second pivot member; a positioning mechanism, including a first portion and a second portion, the first portion and the second portion being pivotally connected, the first portion being pivotally connected to the first pivot member or the first connecting piece, a lengthwise direction of the first connecting piece being defined as a first direction, an extending line from a pivoting point of the first portion and the first pivot member or the first connecting piece to a pivoting point of the first portion and the second portion being defined as a second direction, the second portion being detachably positioned to the second pivot member, the first portion being rotatable between a release position and a fixed position with respect to the second portion, wherein when the first portion is in the fixed position, the first direction being parallel to the second direction or the first direction and the second direction defining an included angle which faces a center of the chain assembly and is less than 180 degrees, and when the first portion is in the release position, the included angle which faces the center of the chain assembly is greater than 180 degrees.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
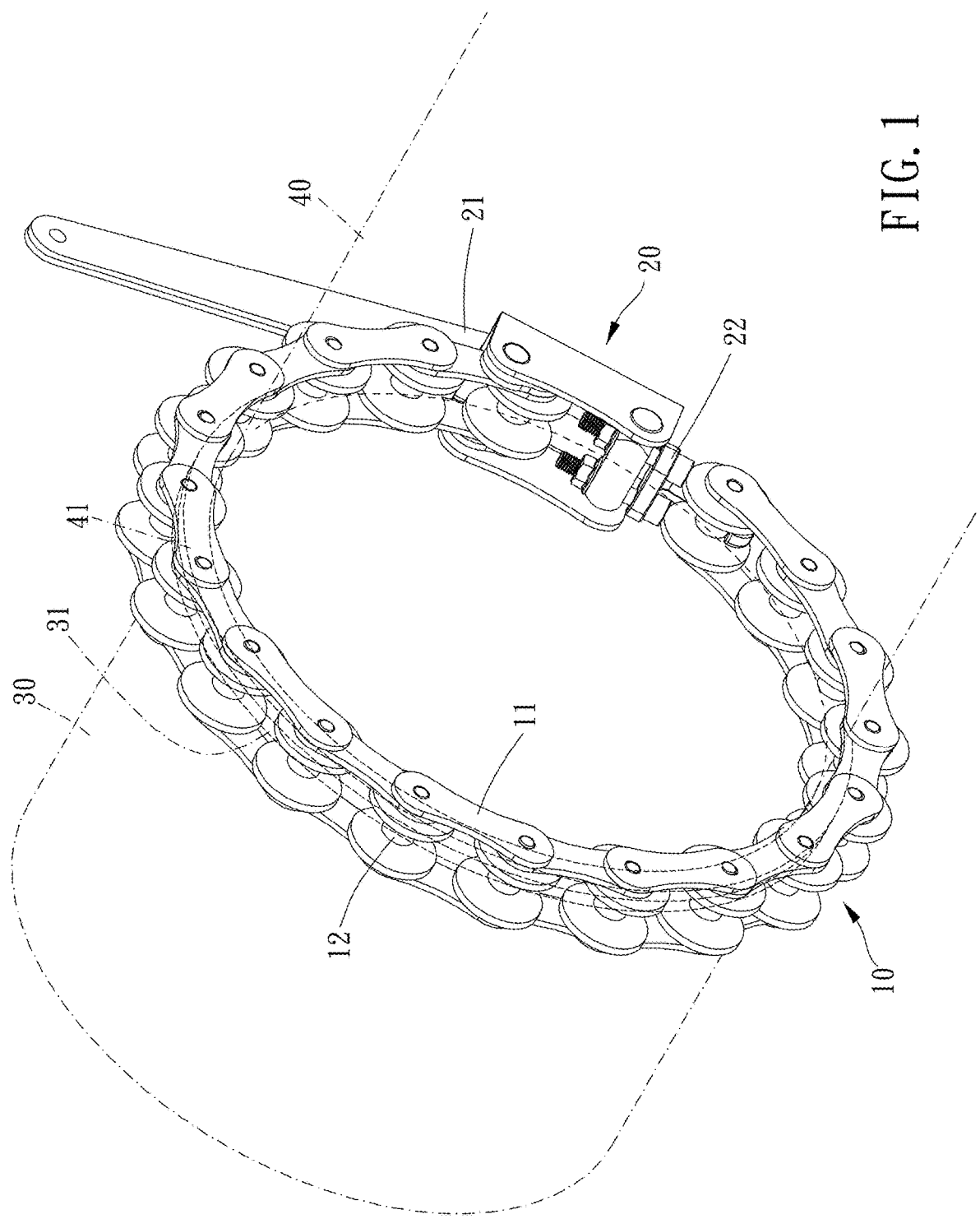
FIG. 1 is a stereogram of a preferable embodiment of the present invention.
Figure 2:
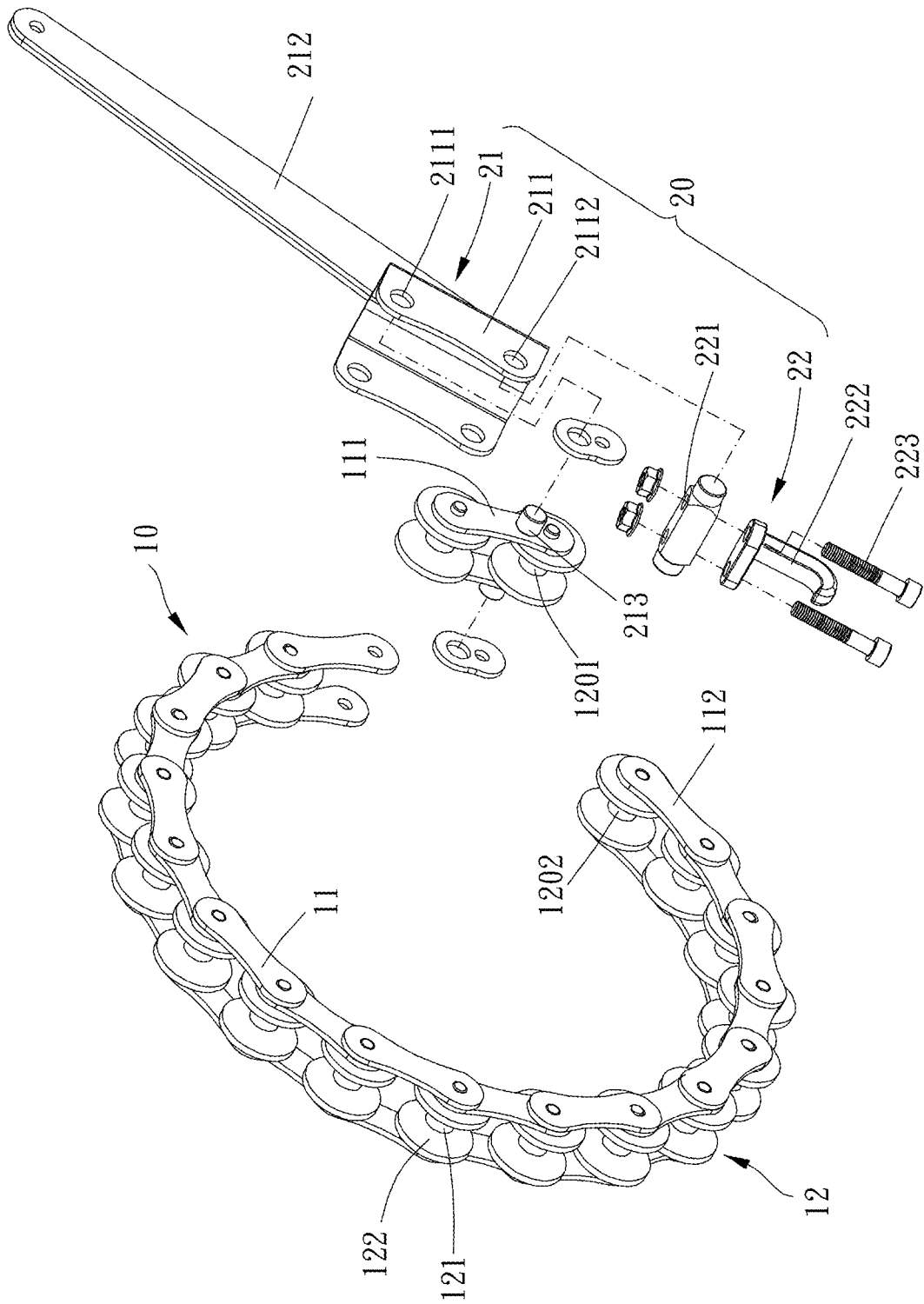
FIG. 2 is a breakdown drawing of a preferable embodiment of the present invention.
Figure 3:
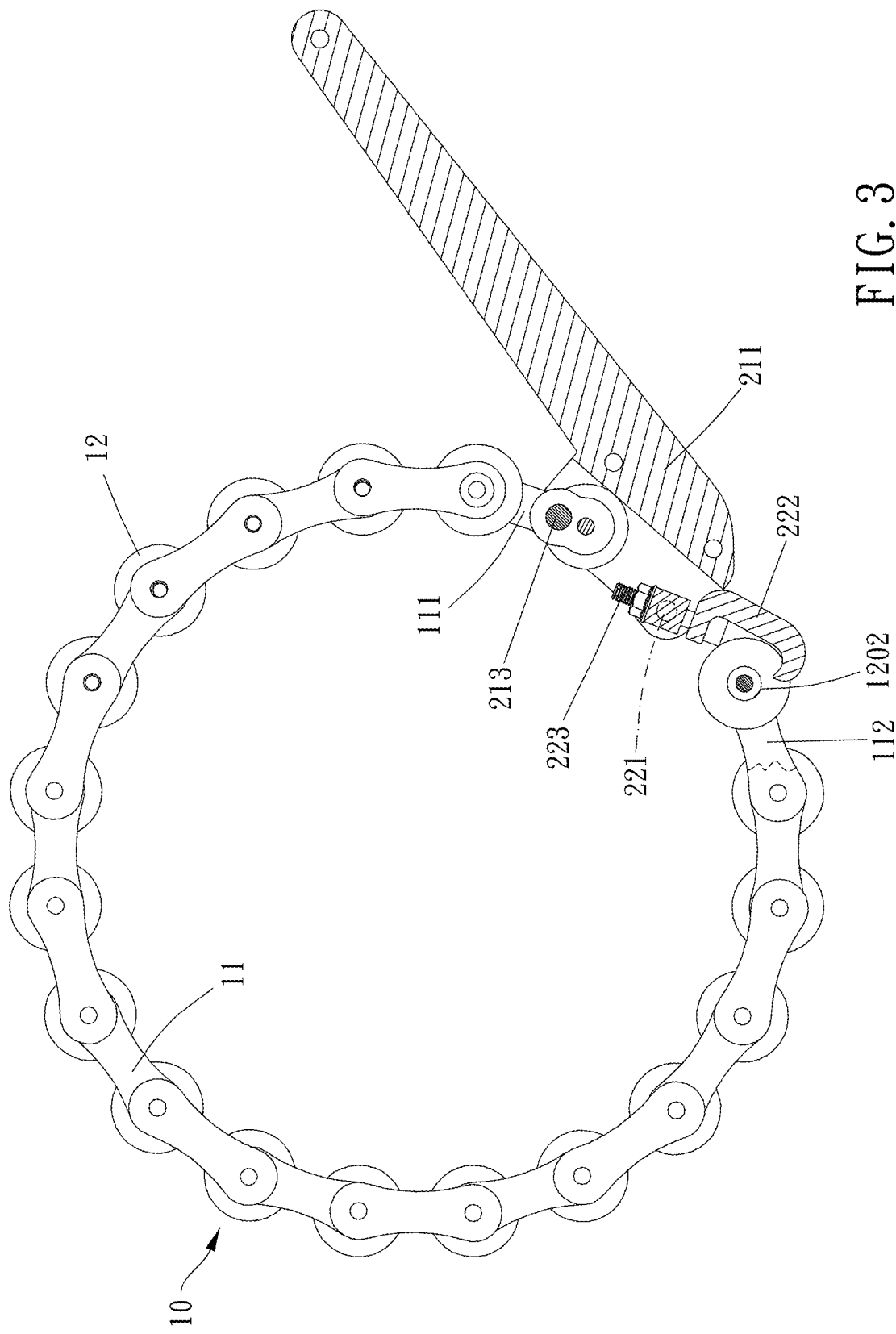
FIGS. 3 and 4 are views showing operation of a preferable embodiment of the present invention.
Figure 4:
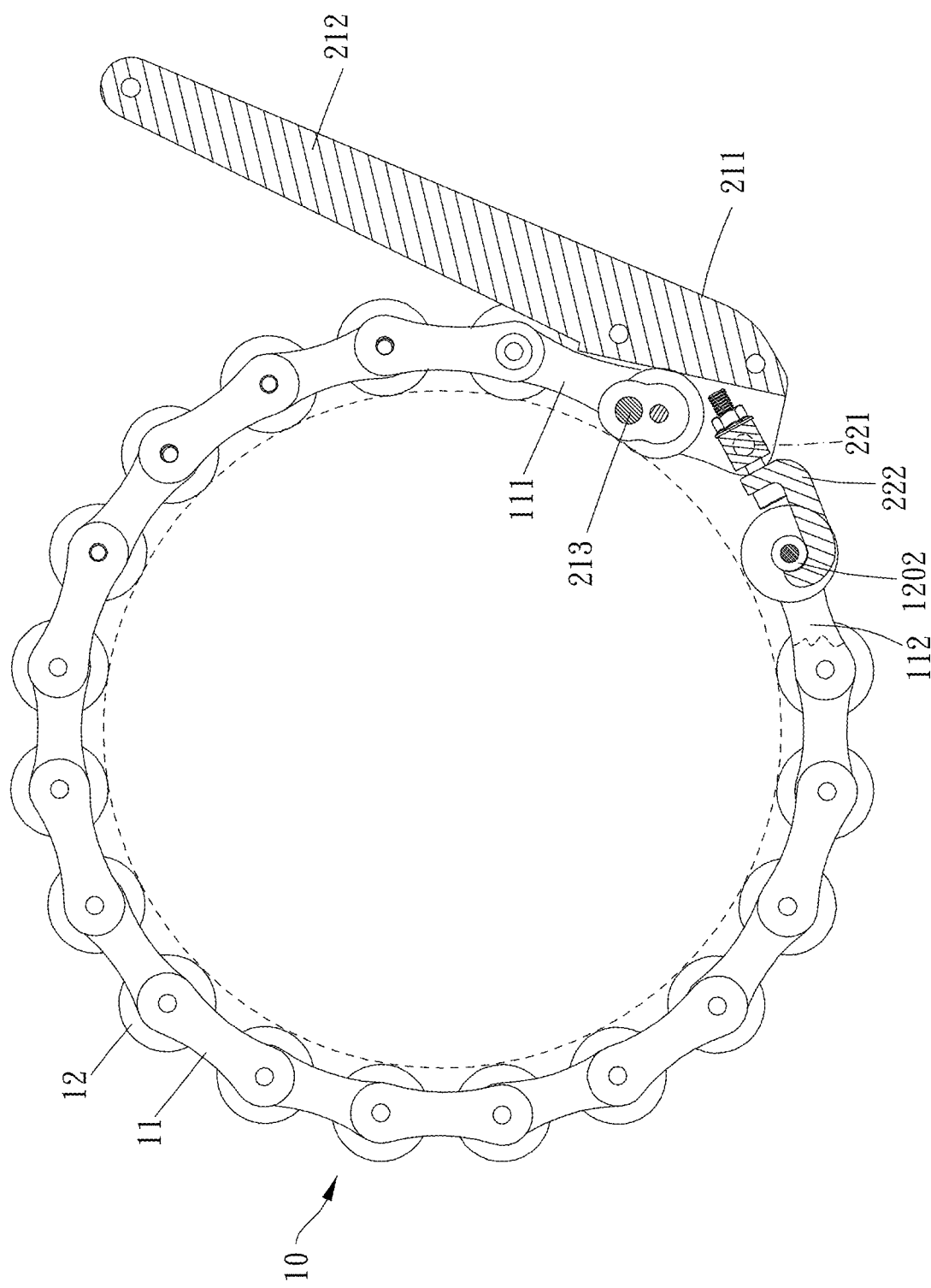

Please refer to FIGS. 1 to 5 for a preferable embodiment of the present invention. A coupling device 1 of the present invention is configured for coupling flanges of two pipes. The coupling device 1 includes a chain assembly 10, 10' and a positioning mechanism 20.

The chain assembly 10, 10' includes a plurality of connecting pieces 11, 11' and a plurality of pivot members 12, and the plurality of connecting pieces 11, 11' are pivotally connected one by one by the plurality of pivot members 12 to be chain-like. One of the plurality of connecting pieces 11 at one of two opposite ends of the chain assembly 10, 10' is defined as a first connecting piece 111, and a free end of the first connecting piece 111 has a first pivot member 1201. Another one of the plurality of connecting pieces 11 at the other of the two opposite ends of the chain assembly 10, 10' is defined as a second connecting piece 112, and a free end of the second connecting piece 112 has a second pivot member 1202.

The positioning mechanism 20 includes a first portion 21 and a second portion 22, and the first portion 21 and the second portion 22 are pivotally connected. The first portion 21 is pivotally connected to the first pivot member 1201 or the first connecting piece 111. A lengthwise direction of the first connecting piece 111 is defined as a first direction, and an extending line from a pivoting point of the first portion 21 and the first pivot member 1201 or the first connecting piece 111 to a pivoting point of the first portion 21 and the second portion 22 is defined as a second direction. The second portion 22 is detachably positioned to the second pivot member 1202, and the first portion 21 is rotatable between a release position and a fixed position with respect to the second portion 22. When the first portion 21 is in the fixed position, the first direction is parallel to the second direction or the first direction and the second direction define an included angle which faces a center of the chain assembly 10, 10' and is less than 180 degrees, and when the first portion is in the release position, the included angle which faces the center of the chain assembly 10, 10' is greater than 180 degrees.

Specifically, the plurality of connecting pieces 11 include pairs of said connecting pieces 11. The connecting pieces of each of the pairs of said connecting pieces 11 are distanced and arranged side by side and are respectively connected with the connecting pieces of one another of the pairs of said connecting pieces 11. Each of the plurality of pivot members 12 is disposed between the connecting pieces of one of the pairs of said connecting pieces 11. Each of the plurality of pivot members 12 is substantially reel-shaped and includes a shaft 121 and two end plates 122 respectively extending radially form two ends of the shaft 121, and a space between the two end plates 122 is configured for the flanges of the two pipes to engage therewithin.

In this embodiment, the first portion 21 of the positioning mechanism 20 includes a main body 211 and a lever 212, the main body 211 is connected with the lever 212, and two opposite ends of the main body 211 are pivotally connected with the first connecting piece 111 and the second portion 22, respectively. The second portion 22 of the positioning mechanism 20 includes a connecting body 221 and a hook member 222, and the connecting body 221 and the main body 211 of the first portion 21 are pivotally connected. The hook member 222 is disposed at an end of the connecting body 221 opposite to the main body 211, and the hook member 22 is configured to be detachably hooked with the second pivot member 1202. Specifically, the main body 211 is substantially U-shaped, and the main body 211 includes a bottom face and two side faces, and the two side faces include one said first pivoting hole 2111 and one said second pivoting hole 2112, respectively. The first connecting piece 111 is pivoted to the at least one first pivoting hole 2111 by an axle 213 (preferably, the axle 213 is located between two of the plurality of pivot members connected to two ends of the first connecting piece 111). The connecting body 221 of the second portion 22 is pivoted to the at least one second pivoting hole 2112. The second portion 22 of the positioning mechanism 20 further includes a threaded member 223, and the threaded member 223 is disposed through the connecting body 221 and the hook member 222 so that the connecting body 221 and the hook member 222 are adjustably connected with each other (the distance between the connecting body 221 and the hook member 222 is adjustable by turning the threaded member 223, whereby adjusting tightening of the chain assembly 10). The threaded member 223 is disposed through the connecting body 221 and extends between the two side faces of the main body 211.

In practice, the chain assembly 10 is disposed around the flanges 31, 41 of a first pipe 30 and a second pipe 40, the hook member 222 hooks the second pivot member 1202, and the lever 212 is depressed toward the chain assembly 10 so that the hook member 222 can hook the second pivot member 1202 firmly and tighten the chain assembly 10. For application to flanges with different diameter, the threaded member is turned to adjust the distance between the hook member and the connecting body, which is easy and convenient.

Figure 5:
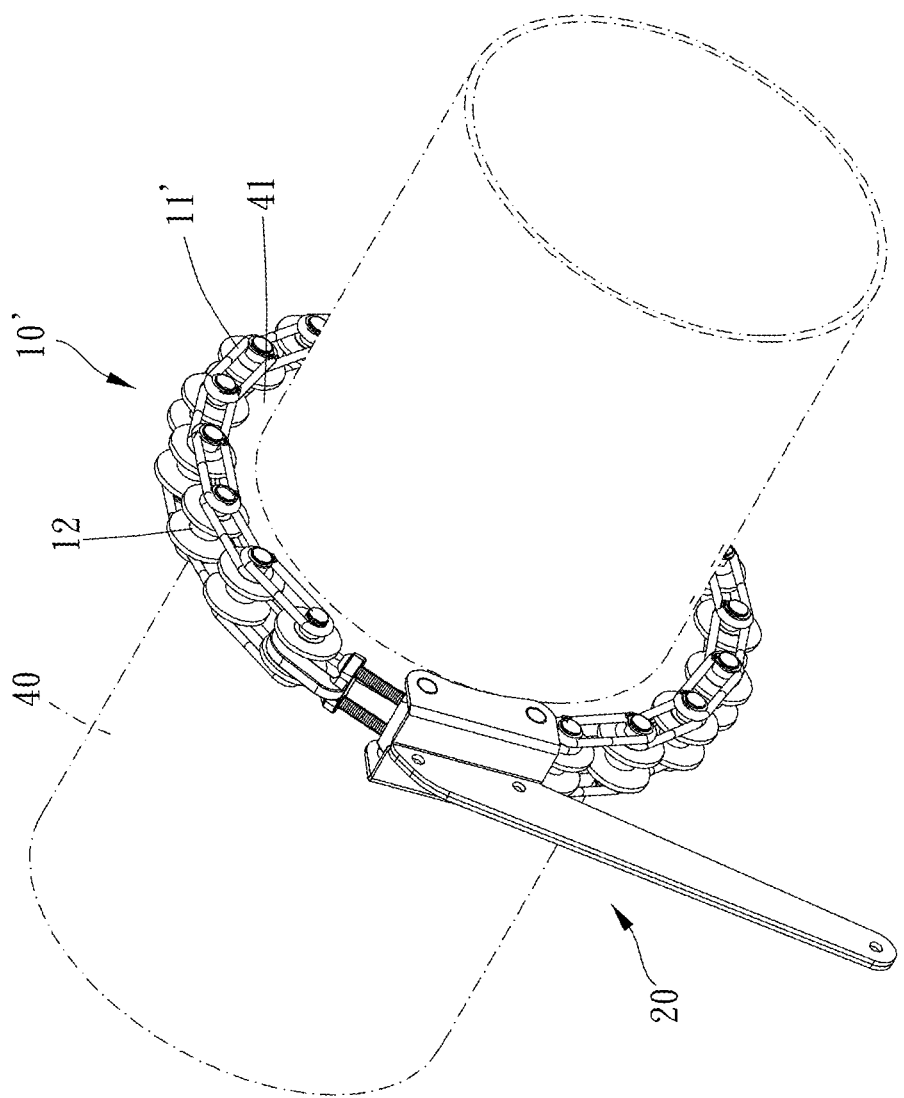
FIG. 5 is a stereogram of a second preferable embodiment of the present invention.

In an alternative embodiment as shown in FIG. 5, each of the plurality of connecting pieces is ring-shaped and disposed around adjacent two of the plurality of pivot members.

With the above structure, the coupling device of the present invention can more reliably fit the outer edge of the flanges of the pipes so as to tightly couple the flanges of the pipes, and this the chain-like structure has good fixation effect. In addition, the coupling device of the present invention can also be applied to flanges of different sizes. The operation and adjustment are very easy and effective.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A coupling device, for coupling flanges of two pipes, the coupling device including:
   a chain assembly, including a plurality of connecting pieces and a plurality of pivot members, the plurality of connecting pieces being pivotally connected one by one by the plurality of pivot members to be chain-like, one of the plurality of connecting pieces at one of two opposite ends of the chain assembly being defined as a first connecting piece, a free end of the first connecting piece having a first pivot member, another one of the plurality of connecting pieces at the other of the two opposite ends of the chain assembly being defined as a second connecting piece, a free end of the second connecting piece having a second pivot member;
   a positioning mechanism, including a first portion and a second portion, the first portion and the second portion being pivotally connected, the first portion being pivotally connected to the first pivot member or the first connecting piece, a lengthwise direction of the first connecting piece being defined as a first direction, an extending line from a pivoting point of the first portion and the first pivot member or the first connecting piece to a pivoting point of the first portion and the second portion being defined as a second direction, the second portion being detachably positioned to the second pivot member, the first portion being rotatable between a release position and a fixed position with respect to the second portion, wherein when the first portion is in the fixed position, the first direction being parallel to the second direction or the first direction and the second direction defining an included angle which faces a center of the chain assembly and is less than 180 degrees, and when the first portion is in the release position, the included angle which faces the center of the chain assembly is greater than 180 degrees;
   wherein the positioning mechanism first portion including a main body and a lever, the main body is connected with the lever, and two opposite ends of the main body are pivotally connected with the first connecting piece and the second portion, respectively;
   wherein the second portion of the positioning mechanism includes a connecting body and a hook member, the connecting body and the main body of the first portion are pivotally connected, the hook member is disposed at an end of the connecting body opposite to the main body, and the hook member is configured to be detachably hooked with the second pivot member;
   wherein the second portion of the positioning mechanism further includes a threaded member, and the threaded member is disposed through the connecting body and the hook member so that the connecting body and the hook member are adjustably connected with each other.

2. The coupling device of claim 1, wherein the plurality of connecting pieces include pairs of said connecting pieces, the connecting pieces of each of the pairs of said connecting pieces are distanced and arranged side by side and are respectively connected with the connecting pieces of one another of the pairs of said connecting pieces, and each of the plurality of pivot members is disposed between the connecting pieces of one of the pairs of said connecting pieces.

3. The coupling device of claim 2, wherein each of the plurality of pivot members is substantially reel-shaped and includes a shaft and two end plates respectively extending radially form two ends of the shaft, and a space between the two end plates is configured for the flanges of the two pipes to engage therewithin.

4. The coupling device of claim 1, wherein the main body is substantially U-shaped, the main body includes at least one first pivoting hole and at least one second pivoting hole, the first connecting piece is pivoted to the at least one first pivoting hole by an axle, and the connecting body of the second portion is pivoted to the at least one second pivoting hole.

5. The coupling device of claim 4, wherein the main body further includes a bottom face and two side faces, and the two side faces include one said first pivoting hole and one said second pivoting hole, respectively.

6. The coupling device of claim 5, wherein the axle is located between two of the plurality of pivot members connected to two ends of the first connecting piece.

7. The coupling device of claim 1, wherein each of the plurality of connecting pieces is ring-shaped and disposed around adjacent two of the plurality of pivot members.

* * * * *